United States Patent [19]

Jordan

[11] Patent Number: 5,778,227
[45] Date of Patent: Jul. 7, 1998

[54] SYSTEM FOR ADDING ATTRIBUTES TO AN OBJECT AT RUN TIME IN AN OBJECT ORIENTED COMPUTER ENVIRONMENT

[75] Inventor: David A. Jordan, Madison, Ala.

[73] Assignee: Intergraph Corporation, Huntsville, Ala.

[21] Appl. No.: 509,847

[22] Filed: Aug. 1, 1995

[51] Int. Cl.$^6$ ............................ G06F 9/40; G06F 9/45
[52] U.S. Cl. .................. 395/682; 395/683; 395/676; 395/705; 707/101; 364/280.4; 364/973
[58] Field of Search ............................ 707/100, 101, 707/103; 395/680, 682, 683, 676, 701, 705; 364/973, 974.4, 280.4

[56] References Cited

U.S. PATENT DOCUMENTS

| | | | |
|---|---|---|---|
| 5,367,671 | 11/1994 | Freigenbaum et al. | 395/600 |
| 5,432,925 | 7/1995 | Abraham et al. | 395/500 |
| 5,475,817 | 12/1995 | Waldo et al. | 395/650 |
| 5,600,838 | 2/1997 | Guillen et al. | 395/683 |
| 5,634,128 | 5/1997 | Messina | 395/682 |
| 5,659,736 | 8/1997 | Hasegawa et al. | 395/611 |

FOREIGN PATENT DOCUMENTS 0 520 924 A2  12/1992  European Pat. Off. .

OTHER PUBLICATIONS

Stevens, Al, "Persistent Objects in C++: Cooperation Among Classes Using A Persistent-Object Database", Dr. Dobb's Journal, v17 n12 p. 34(6), Dec. 1992.

"Modeling Future Attributes," IBM Technical Disclosure Bulletin, vol. 37, No. 07, (Jul. 1994), pp. 645–647.

*Primary Examiner*—Emanuel Todd Voeltz
*Assistant Examiner*—Michael T. Richey
*Attorney, Agent, or Firm*—Charles E. Krueger; Townsend and Townsend and Crew

[57] ABSTRACT

The system uses an intermediary process in an object oriented computer environment to allow application objects to perform operations such as creation, deletion and accessing of other objects. Typically the other objects are database objects. The intermediary process allows associations to be made between add-on attributes and primary objects. The primary objects are objects that are designed to be used by an original application. A later application that wishes to use the same objects as the original application, but with additional attributes, can create, delete and access the additional attributes at run time so that extra functionality is provided to a user of the original application program in an efficient manner.

7 Claims, 7 Drawing Sheets

SYSTEM FOR ADDING ATTRIBUTES TO AN OBJECT AT RUN TIME IN AN OBJECT ORIENTED COMPUTER ENVIRONMENT

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention relates generally to data processing in computer systems and specifically to adding attributes to objects in an object oriented environment executing in a computer system.

Computer systems have seen widespread use in many fields ranging from financial, control systems, data processing and other applications. Typically, a user of the computer system executes a program, called an application program, to perform a specific function or task such as word processing or coordinating the operation of an assembly line. The application program, almost without exception, operates on data that is a separate entity from the application program. The data has characteristics that are distinct from the application program. Unlike the application program the data does not consist of executable instructions that direct the computer system to perform actions but is, instead, a collection of information upon which the application program performs functions. While the application program typically does not change during its lifetime, the data is constantly being added to, modified and sometimes destroyed under the operation of an application program manipulating the data.

A problem with this approach is that it is difficult to change the application program and data to work with data that requires additional information that wasn't contemplated in the initial version of the application program. This is because data is inherently "static" in its definition. In other words, data is rigidly defined so that the application program knows invariable specifics about the data that the application program relies upon in manipulating the data. For example, where there is a computerized record of information about employees that is searched and updated by a personnel management program the personnel management program expects that if each record is defined to include a person's name and telephone number then there is no provision for adding a second telephone number to the database. In this example, the person's name and telephone number are called "fields" of the record. The number and order of fields in the record is referred to as the record's "data format."

The reasons for having static, or fixed, fields is that processing is faster because the application program knows exactly what each record contains and where to look for each field. This is analogous to having forms that make it easier for humans to search and retrieve specific types of information. However, a problem with this approach is that it prevents modification and improvement to the application program and data structure. In order to provide the application program with the ability to manipulate additional fields, the application program must be modified to handle the new data structure. This usually means that the original developer of the application program must release a new version of the application program that the user must use to replace the prior application program. This means additional cost to the user to obtain and install the new application program. The reason that the developer must release a new version of the application program is that the properties of the record, for example the number and type of fields in the record, are ingrained into the application program by a process called "compilation," discussed below, that forces a programmer of the application program to exactly define the record. If the record format is changed, the entire application program must be recompiled with the new record definition.

Potentially, an even bigger problem with modifying the record format is that all of the records in the old data format need to be translated into records in the new data format. This is similar to copying the information from an old form into a new form for each person in the database. Where there are many records, or forms, this translation task can be a huge one. Solutions such as maintaining two separate copies of each record, one in the original format and one in another format, are too burdensome in the amount of computer storage and cross-referenced updating that must be performed.

Another disadvantage of the traditional data processing model is that it is very difficult for third party developers (i.e., a manufacturer other than the original manufacturer) to add functionality to the original application program. To continue with the example, if a third party wanted to come out with an add-on to the original application program that handled a second telephone number for each person in the database, it would be very difficult, if not impossible, for the third party software to modify the database to include the second telephone number and still leave the database compatible with the original application program that had no provision for handling the second telephone number.

FIG. 1A illustrates the steps and components to modify shared data definitions in the traditional data processing model. In FIG. 1A, application program source code 102 is designed to process data types defined by data declaration 104. Typically the steps of preparing the application program source code and data declarations are performed by a human programmer. Next, application program source code 102 and data declarations 104 are provided to compiler 106. Compiler 106 is software executed by a computer at "compile time" that combines the information in application program source code 102 and data declarations 104 along with, for example, language definitions, predefined library modules, etc. to produce executable 108.

Executable 108 is loaded into computer system 110 to become loaded executable image 114 which is executed at "run time" so that instructions defined by application program source code 102 are executed to perform the intended functions. During the course of executing the instructions, data structures 116 are created, modified or deleted in memory according to data declarations 104. Other software that is part of the run-time environment, such as operating system software 112, also executes within the computer system. Data structures 116 may be swapped back and forth from a persistent storage means such as storage 118.

From FIG. 1A it should be apparent that, in order to modify data structures 116 within computer system 110, it is necessary to modify data declarations 104, re-compile application source code 102 with the new data declarations, re-load the resulting executable and execute the new executable image. Since each application program that uses the data structures at run time must be compiled with the desired data declaration, the traditional data processing model of FIG. 1A makes it very difficult to achieve the goal of efficient addition of functionality by a third party.

One effort at solving the problems of the traditional data processing model described above is with the so-called "object oriented" approach to programming. The object oriented approach is successful in providing a standard so that added functionality can be developed independently by third party developers and still be compatible with original functionality developed by an original developer. The object oriented approach also defines a way to manipulate data that allows more flexibility over the traditional data processing model. However, the object oriented approach does not fully solve the problems described above.

This specification discusses the invention with specific regard to two exemplary implementations of object oriented approaches. Namely, the C++ language environment and the Object Linking and Embedding (OLE) operating system environment by Microsoft, Corp. A detailed description of the C++ object oriented environment may be found, for example, in Borland C++ User's Guide and Borland C++ Library Reference manuals and other information provided by Borland, Inc. about their C++ language implementation. Microsoft Press publishes "Inside OLE 2," 1st and 2nd editions, by Kraig Brockschmidt which describes OLE in detail. A large number of textbooks on the subject of object oriented programming, in general, are available. For example, "Object-Oriented Analysis and Design," by James Martin and James J. Odell, Prentice Hall, may be consulted for principles of object oriented design that are not specific to a particular implementation of an object oriented environment such as C++ or OLE.

A minimum of the concepts and details of object oriented environments is discussed in this specification for purposes of disclosing the invention and distinguishing the invention over the prior art. Where this specification uses terms in contrary manner to the available literature, this specification is controlling. Note that the available literature, itself, sometimes provides jargon with conflicting definitions for the same terms.

The object oriented approach centers around the idea of an "object." An object can include executable instructions and/or data. This is unlike the traditional data processing model discussed above where the database did not include executable instructions. Instead the executable instructions in the traditional data processing model were part of the application program, only. An advantage to using objects is that the database can now include sets of instructions, often called "methods," that perform functions on the data. Thus, the original application (which would also be an object) in the object oriented world might pass telephone number data to the database object and request that the telephone number be stored in the database. The database would then store the telephone number in the database in the proper field.

A third party application could be designed to handle a second telephone number. This third party application, or "derivative" application, would produce data files that are incompatible with the data files of the original application. The derivative program would be able to read data produced by the original program but the derivative program would not be able to write the second telephone number to data files created by the original program. The original program would not be able to read data files produced by the derivative program.

Thus, the object oriented approach does not fully solve the problem of allowing truly independent development of additional functionality where the added functionality requires a change in the data format. Typically, data translation from the original data format to the derivative data format would have to be performed by the user. This necessarily requires that the derivative program developer understands the original application developer's methods for handling the first telephone number. Similarly, the original developer cannot update its system and include an update of the database object without adversely affecting the user's system when the user's system includes the third party database object unless the original developer incorporates the third party developer's methods for handing the second telephone number. Thus, the prior art problem of efficiently adding independent third party functionality still exists in the object oriented data processing model.

The object oriented data processing model is limited in the same way that the traditional data processing model is limited in that the format of data types manipulated by different applications must be defined in advance of executing the application programs to manipulate the data.

FIG. 1B illustrates the steps and components to modify a database object in the object oriented data processing model. The database object is used by different application programs at run time so that a single database object may be common to two or more application programs.

Similar to the step of creating application source code and data declarations in FIG. 1A, database object definition 130 is created by a human programmer as the first step in FIG. 1B. Next, database object definition 130 is provided to compiler 132 which performs similarly to the compiler of FIG. 1A and generates executable object 134.

Executable object 134 is loaded into computer system 136. Executable object 134 is shown within computer system 136 as database object 138. Database object 138 is executed at run time in the object oriented environment that includes application object 1, application object 2 and various environment objects 140. Environment objects 140 may include, for example, standard objects in an environment such as OLE. During the course of execution, the application objects access database object 138 so that a database according to database object definition 130 may be created, modified and deleted. Portions of the database may be moved from memory 142 to persistent storage 144.

Note that even though the object oriented data processing model of FIG. 1B provides advantages over the traditional data processing model of FIG. 1A, there are still drawbacks. One problem is that, in order to change the database definitions it is still necessary to modify database object definition 130 and perform the compile, load and execute steps. Thus, in the prior art, adding properties, or "attributes," to an existing object is difficult. This specification refers to the modification of an object so that additional functionality (in the form of an additional method) or additional information (in the form of additional data) is associated with the object as adding an "attribute" to the object.

In C++, attributes can be added to existing objects by "class inheritance," or "subclassing," from existing object classes. In OLE, attributes can be added to existing objects by "aggregating" an existing object class. Essentially, both ways of adding attributes to existing objects create a new object class that incorporates the data types of the existing object and adds data types.

As a further example of the prior art, aggregation in the OLE environment is next discussed.

OLE provides a data model called the Component Object Model (COM). COM allows objects to have data, in the form of "properties," and executable functions, in the form of "methods." Also, objects have "interfaces" so that other objects can invoke and make use of a given object's functionality (i.e., "attributes," including properties and methods) by making "requests" to the given object through the interfaces.

FIG. 1C is a diagram of a COM object 200. COM object 200 has a name, "Object__A." Object__A includes interfaces 202, 204 and 206. Object__A also includes attributes such as executable functions 210 and 212, and data 214 and 216. Object__A also includes a separate object named Object__B. Note that Object__B includes its own executable functions 220 and 222 along with data 224 that is internal to Object__B. Object__B also includes interface 230 that is only directly accessible to Object__A, and interface 206 that is "directly exposed" through Object__A to the object-oriented environment so that other objects may access Object__B directly through interface 206 even though interface 206 appears to be an interface of Object__A.

The method of directly providing an included object's interface (206 in FIG. 1C) through the including object (Object__A in FIG. 1C) is known as "aggregation" in OLE. This allows attributes to be added to an existing object, Object__A. However, the specifying of aggregated objects must be performed at compilation time so this approach has the same drawbacks as the other prior art approaches discussed above. Further, there are problems with handling the interfaces in aggregated objects that require additional memory overhead to maintain pointers and other referential data between the aggregated objects.

Therefore, it is desirable to produce an invention that efficiently allows attributes to be added to existing objects at runtime.

SUMMARY OF THE INVENTION

The present invention allows attributes to be associated with objects at run time. In one embodiment this is accomplished by providing additional code for associating, or registering, interfaces to existing objects, deleting interfaces from existing objects and determining which interfaces are associated with an object.

The invention includes a method for associating a property with an object in a computer system. The computer system includes a processor coupled to a memory and a storage device. The computer system also includes objects having data members and class definitions specifying one or more class properties of an object. The method includes the steps of compiling a definition of a first object as a first instance of the class, wherein the first object has the class properties specified in the class; compiling a definition of a second object as a second instance of the class, wherein the second object has the class properties specified in the class; and compiling a definition of a third object, wherein the third object includes an added property that is not specified in the class.

Further, in the method, the following steps are performed subsequent to the steps above: using the definition of a first object to create a first object; using the definition of a second object to create a second object; using the definition of a third object to create a third object; associating the third object with the second object; executing instructions in a first application to access the first object and transfer information about the first object's class properties to the first application; executing instructions in the first application to access the second object and transfer information about the second object's class properties to the first application; and executing instructions in a second application to access the second object and transfer information about the added property of the third object associated with the second object to the second application.

DETAILED DESCRIPTION OF A PREFERRED EMBODIMENT

Figure 2:
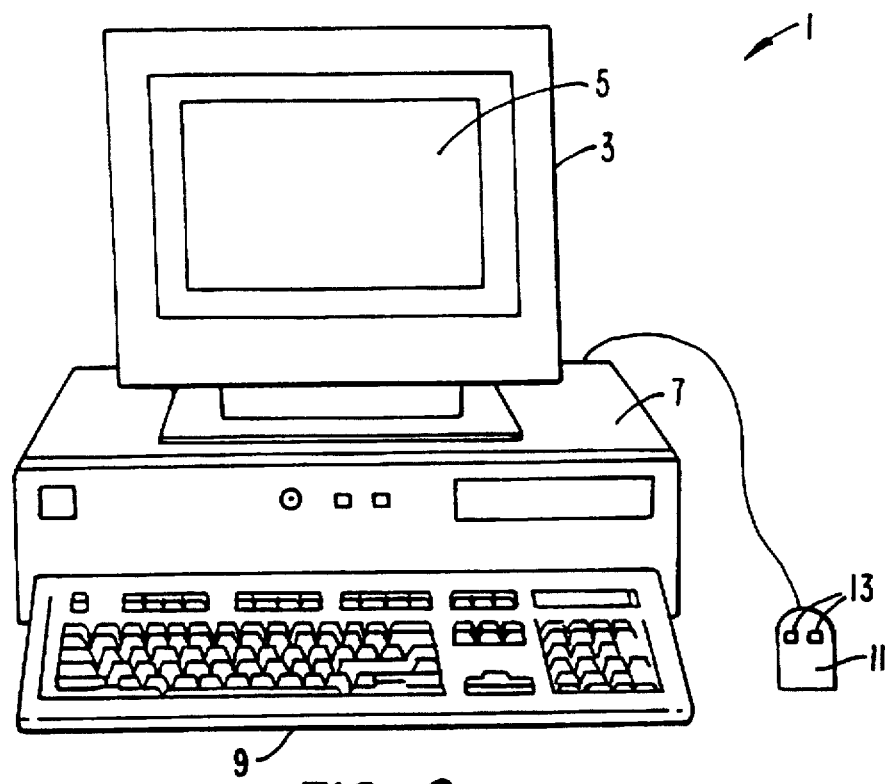
FIG. 2 is an illustration of a computer system suitable for use with the present invention.

FIG. 2 is an illustration of a computer system suitable for use with the present invention. FIG. 2 depicts but one example of many possible computer types or configurations capable of being used with the present invention. FIG. 2 shows computer system 1 including display device 3, display screen 5, cabinet 7, keyboard 9 and mouse 11. Mouse 11 and keyboard 9 are "user input devices." Other examples of user input devices are a touch screen, light pen, track ball, data glove, etc.

Mouse 11 may have one or more buttons such as buttons 13. Cabinet 7 houses familiar computer components such as disk drives, a processor, storage means, etc. As used in this specification "storage means" includes any storage device used in connection with a computer system such as disk drives, magnetic tape, solid state memory, bubble memory, etc. Cabinet 7 may include additional hardware such as input/output (I/O) interface cards for connecting computer system 1 to external devices such as an optical character reader, external storage devices, other computers or additional devices.

Figure 3:
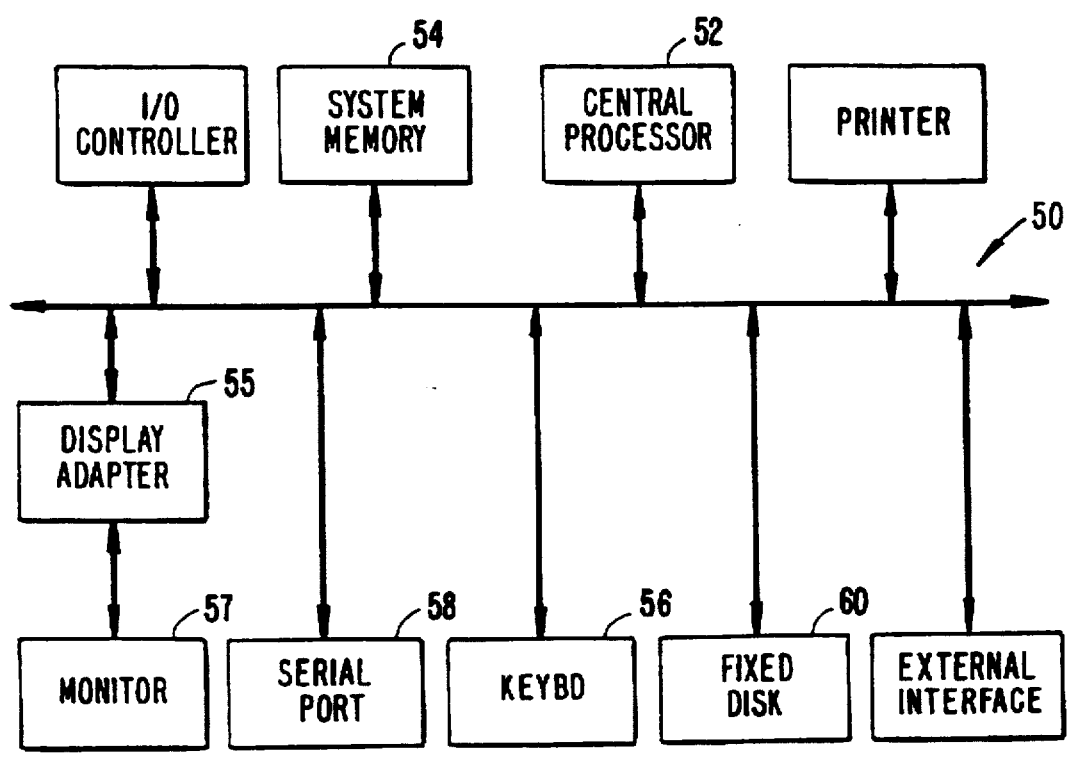
FIG. 3 is an illustration of basic subsystems in the computer system of FIG. 2.

FIG. 3 is an illustration of basic subsystems in computer system 1 of FIG. 2. In FIG. 3, subsystems are represented by blocks such as central processor 52, system memory 54, display adapter 55, monitor 57, etc. The subsystems are interconnected via a system bus 50. Additional subsystems such as a printer, keyboard, fixed disk and others are shown. Peripherals and input/output (I/O) devices can be connected to the computer system by, for example, serial port 58. For example, serial port 15 can be used to connect the computer system to a modem or mouse input device. The interconnection via system bus 50 allows central processor 52 to communicate with each subsystem and to control the execution of instructions from system memory 54 or fixed disk 60, and the exchange of information between subsystems. Other arrangements of subsystems and interconnections are possible.

The present invention provides advantages to application programs executing in object oriented environments such as OLE. In OLE, COM objects are described by the interfaces that they support. Each interface is a means to access data or invoke a function of the object. Thus, an objects attributes (i.e., data or functions) are determined by the number and type of interfaces that are provided to the object. In order to add attributes to existing objects, the present invention uses a program that creates, destroys and otherwise maintains and provides information on attribute associations among objects, attributes and interfaces at run time. In an embodiment currently under development, this invention is being adapted for use in an application known as Viking. The program that maintains the attribute associations is called the Persistence Subsystem and the attribute associations are referred to as "satellite data."

First, some of the advantages of using satellite data in application programs are presented. Next, the manner in which the Persistence Subsystem implements satellite data is discussed. Finally, the differences between satellite data and standard object oriented approaches to adding attributes are described.

An example of an application that uses satellite data is a software architectural package that allows a user to model the interior layouts of rooms in a building. The package supplies database objects that describe the geometry of the various types of furniture that can be placed in a room, and application objects for making room layouts using the furniture described by the database objects and displaying the results. The furniture shapes are stored in the database objects as geometric shapes with a uniform surface. Sometime after the original software package has been delivered, the original developer, or another developer, can provide an add-on application object that gives the capability to describe the surface material of each of the objects. Thus, the furniture can now have more detail since colors or textures can be rendered when the furniture is displayed to give more realistic images.

Figure 4:
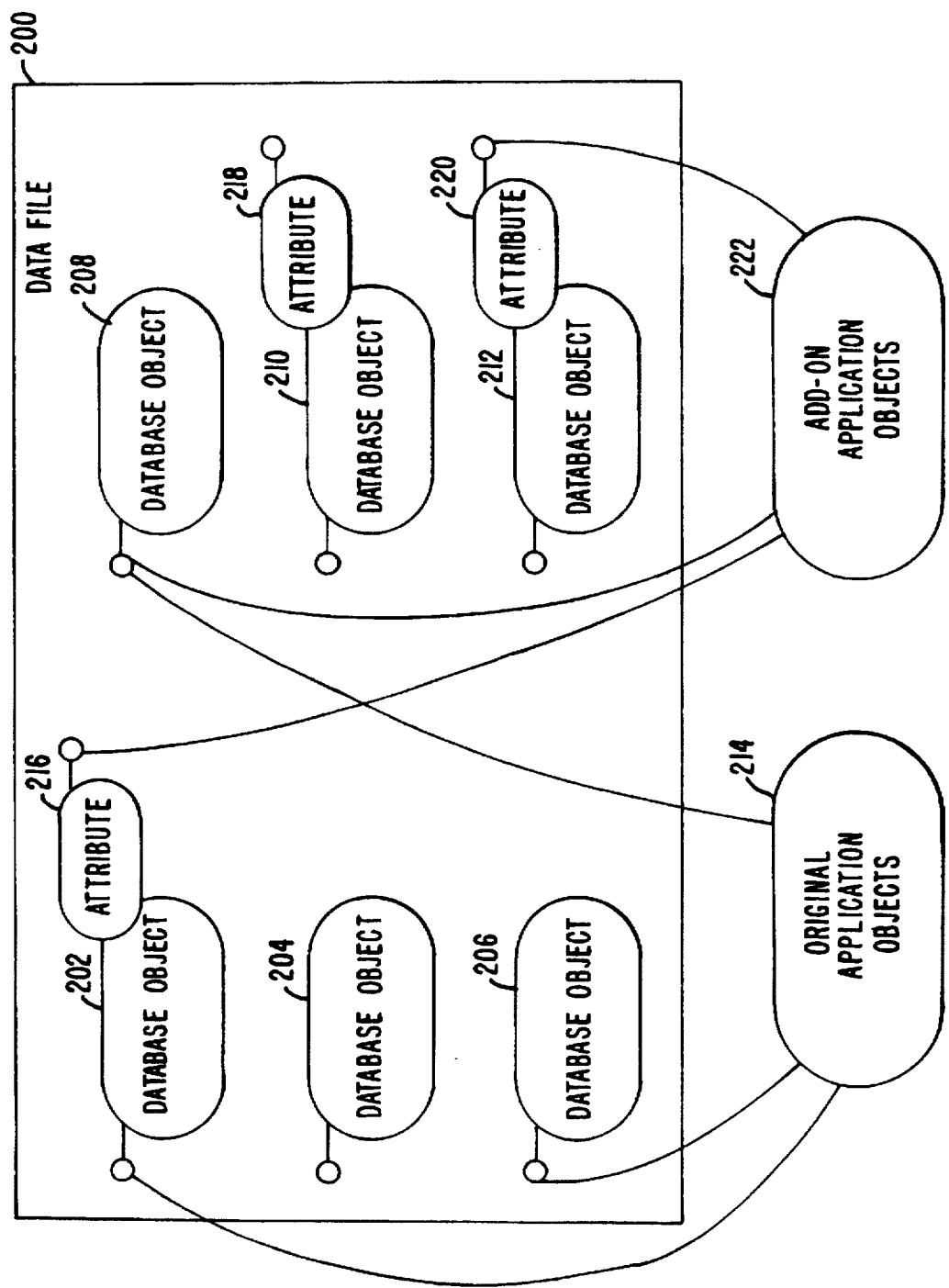
FIG. 4 illustrates the concept of satellite data.

FIG. 4 illustrates the concept of satellite data in the software architectural package described above. In FIG. 4, database 200 includes database objects 202–212. Database objects 202–212 are created, accessed and destroyed by original application objects 214. Satellite data in the form of added attribute objects such as attributes 216–220 is also shown in FIG. 4. In FIG. 4, the association of an added attribute with a database object is shown by having the added attribute object adjacent to the associated database object. Thus, attribute 216 is associated with database object 202, attribute 218 is associated with database object 210 and attribute 220 is associated with database object 212.

In accordance with the example, original application objects 214 implement the original software architectural package with the simple furniture shape representation (i.e., without surface material). Original application objects access the database objects via the database objects' interfaces as suggested by lines from original application objects 214 to representative database objects 202, 206 and 208. The database objects are accessed, for example, to provide data or perform functions, such as obtaining the dimensions of a piece of furniture being modeled by the database object or to have the database object display a piece of furniture.

On the other hand, add-on application objects 222 are provided to create, access and destroy the added attribute objects. In the example, the added attribute objects include information for displaying a piece of furniture in a database object with surface material. The add-on application objects allow a user to create the added attribute by specifying a surface material, assign the attribute to one or more database objects, and further edit or destroy the added attribute objects. Note that the original application objects will never access the added attribute objects since the original application objects were designed prior to, and independently of, the added attribute objects and do not have any knowledge of the added attribute objects.

On the other hand, the add-on application may have knowledge of the original database objects and may access their interfaces. This allows the add-on application to easily add functionality to the existing software architectural package. For example, where the original package has a "draw" command for invoking the drawing function in a database object to draw a piece of furniture as a flat-shaded object, the add-on objects include a "draw" command that accesses the database object interface to draw the furniture as a flat-shaded object and then accesses the associated attribute object's interface to render the furniture with a surface material.

Table I shows a C function, DrawFurniture, that would be included in an add-on application to render a furniture object, FurnitureObject, differently depending on whether or not the furniture object has surface material satellite data associated with it. Thus, the routine DrawFurniture corresponds to the latter example where the add-on application has knowledge of the original database object format.

TABLE I

```
DrawFurniture( FurnitureObject *pObject )
{
    struct SurfaceMaterial Material;
    if ( DoesSatelliteDataExist( pObject, SURFACE_MATERIAL ))
    {
        GetSatelliteData( pObject, SURFACE_MATERIAL,
                          &Material );
        RenderObjectWithSurfaceMaterial ( pObject, Material
    );
    }
    else
    {
        StandardRenderObject( pObject );
    }
}
```

Two functions are used to extract the satellite data. A first function, DoesSatelliteDataExist, returns TRUE or FALSE, depending on whether or not the requested type of data has been associated with the object in question. A second function, GetSatelliteData, actually retrieves that data. In the example of Table I, the satellite data described in structure SurfaceMaterial is identified by the SURFACE_MATERIAL tag.

Two additional functions, RenderObjectWithSurfaceMaterial and StandardRenderObject are used to draw the object on the screen with surface material or without surface material. In the code example of Table I, RenderObjectWithSurfaceMaterial is used to access both the satellite data describing a surface material, such as attribute 216 of FIG. 4, and a standard database object, such as database object 202. The function StandardRenderObject is used to render the object without satellite data by merely using the standard database object 202.

There may be many more database objects in the database than the six shown in FIG. 4. Also, a database object may have more than one attribute associated with it. Attributes may also be associated with more than one database object. This scheme allows a hierarchy of "layers" of attributes from many add-on application objects to be used with the original software package and original database objects. For example, attributes can be associated with other attributes. A given type of attribute, such as surface material data, can be associated with many different types of objects such as the database object to define furniture geometry and another database object that defines wiring or plumbing. An attribute object can be created to work with any database object or the attribute object can be limited to certain types of objects. Broadly, the invention provides that attribute objects can be associated with predefined objects.

Figure 1A:
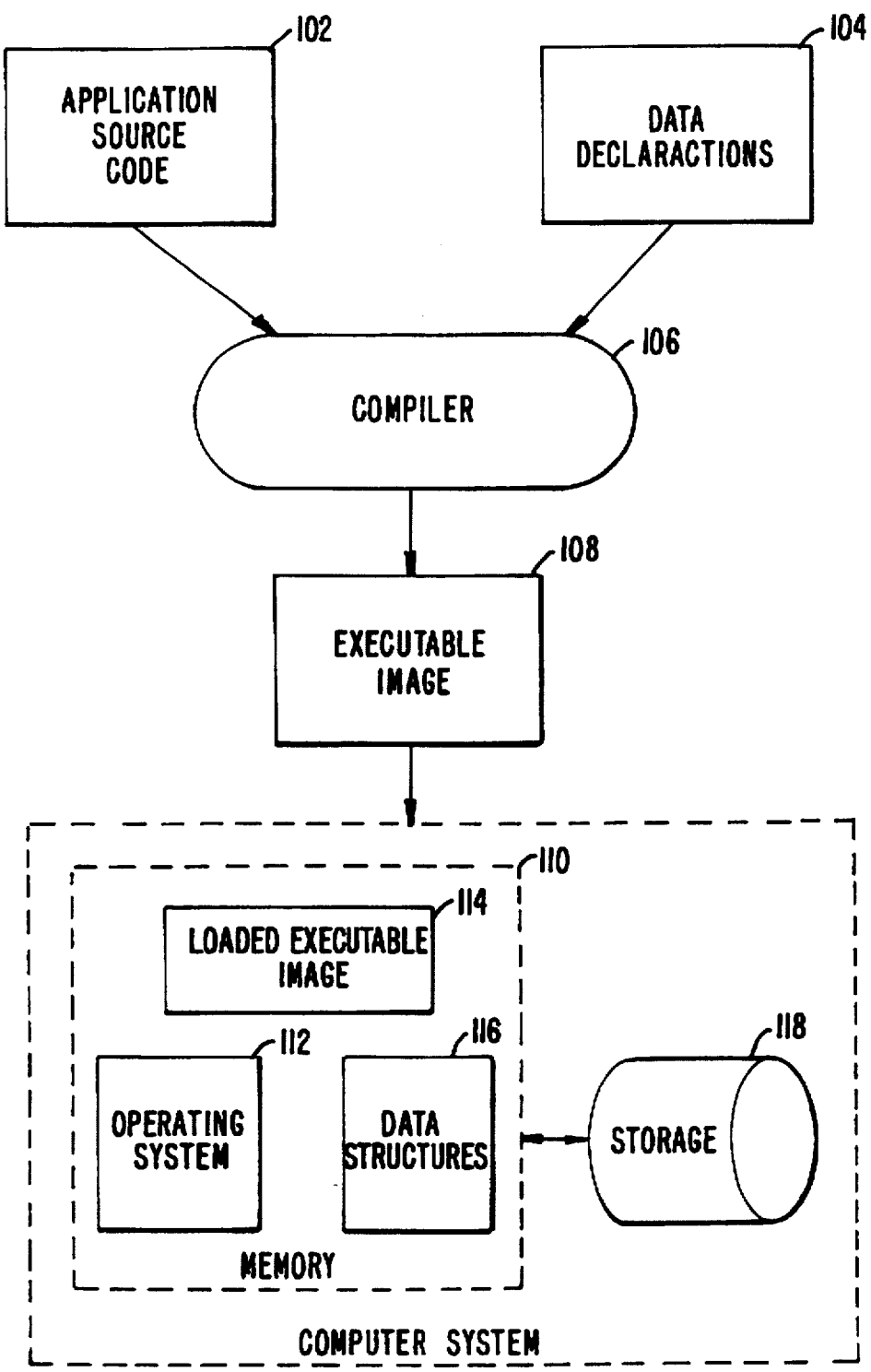
FIG. 1A illustrates the steps and components to modify shared data definitions in a traditional data processing model.
Figure 1B:
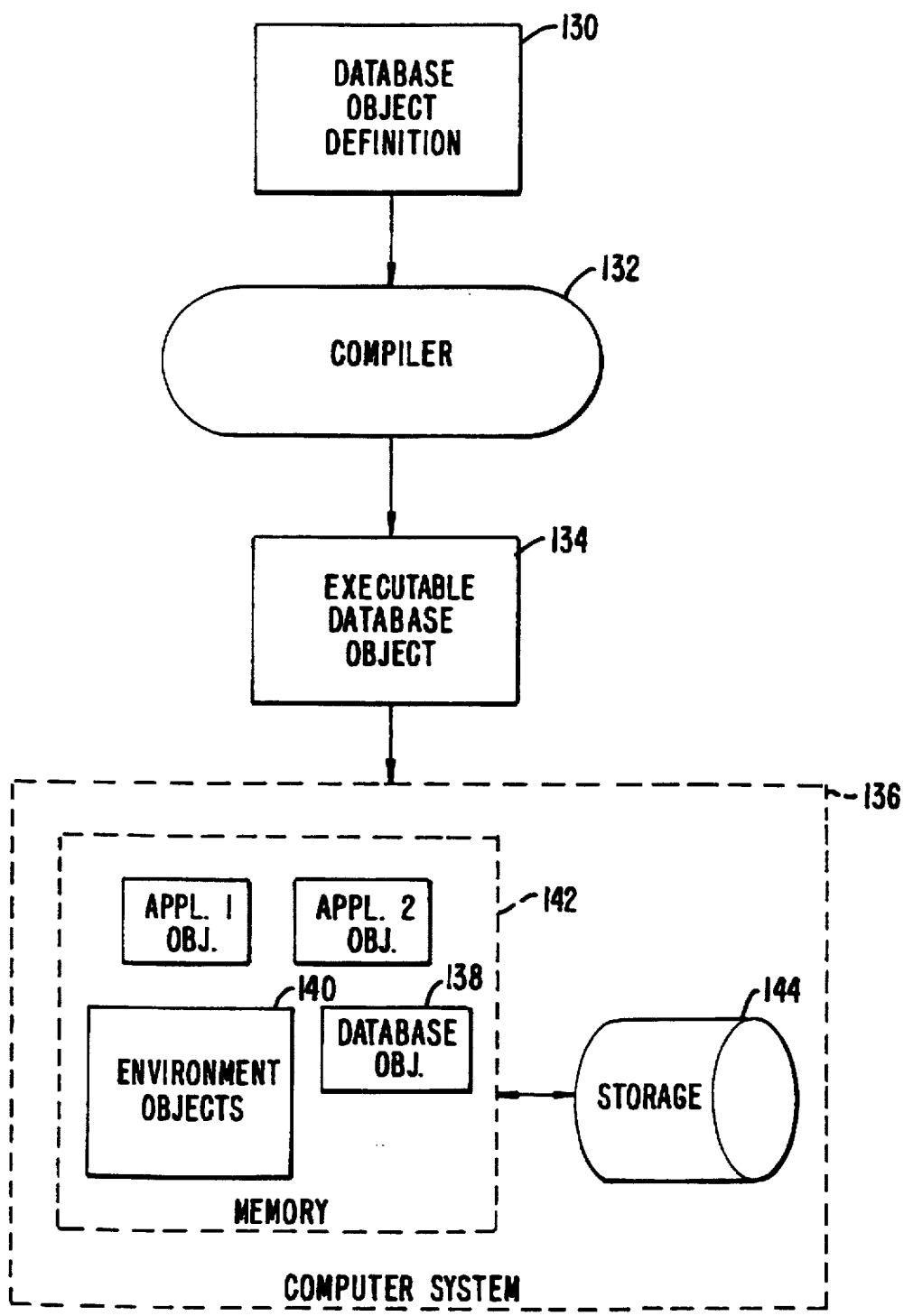
FIG. 1B illustrates the steps and components to modify a database object in the object oriented data processing model.
Figure 1C:
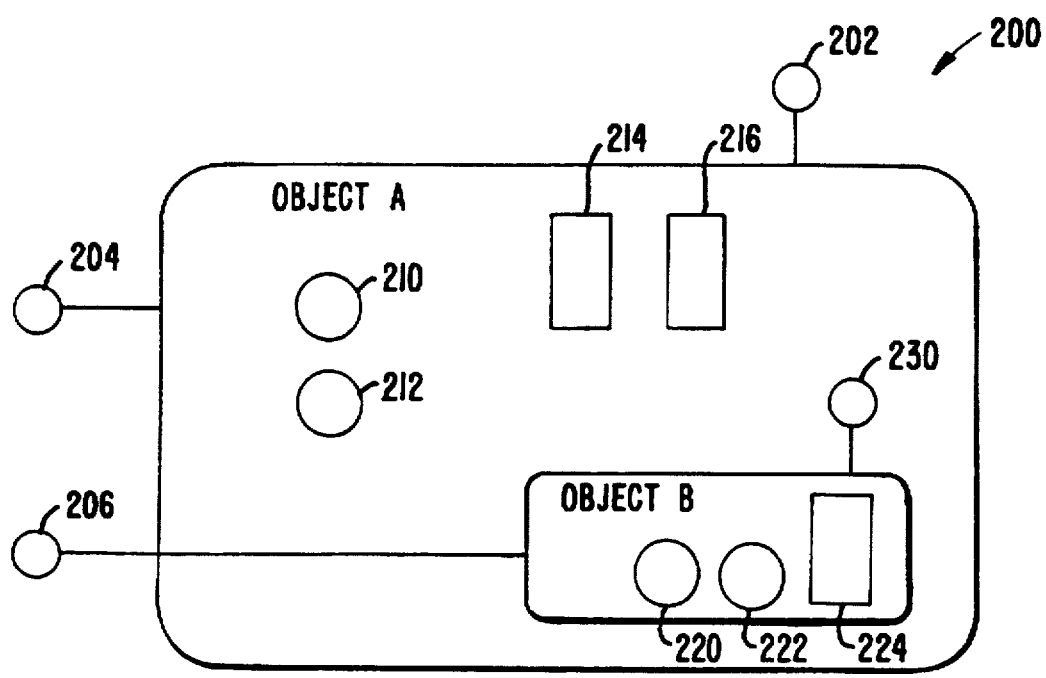
FIG. 1C is a diagram of a COM object.

Note that the predefined objects, e.g., the database objects of FIG. 4, are typically created in the standard way by defining the database objects and then compiling the database object definitions as discussed above in connection with FIG. 1B. On the other hand, attribute objects such as attribute 216 may be defined in a similar manner and associated at "run time." "Run time" is defined as the time at which the interfaces of the database objects and attribute objects may be accessed by application objects. The run time operation of the present invention is discussed below in connection with the Persistence Subsystem. The preferred embodiment uses the Typelib, a data describing component of OLE Automation, to define add-on objects. This allows the end-user to define and manipulate the attributes. Details of Typelib may be found in "OLE 2 Programmer's Reference Manual," published by Microsoft Press.

This approach allows for true "plug-and-play" add-on application objects. Any number of add-on application objects can simply be assembled into application objects on the fly. Even the end-user can assemble new objects by specifying that attributes be associated with existing objects. The attributes, themselves, can be defined by the user. For example, a user interface can allow a user to augment an existing object by picking an attribute represented as an icon from a palette, dragging the icon to a graphical representation of the existing object and "dropping" the attribute on the existing object. By using the approach of satellite data there is no need to change object definitions for re-compile. The bookkeeping overhead maintained by OLE and "C," such as the TypeLib in OLE, is also used for attribute definitions in the preferred embodiment.

Figure 5:
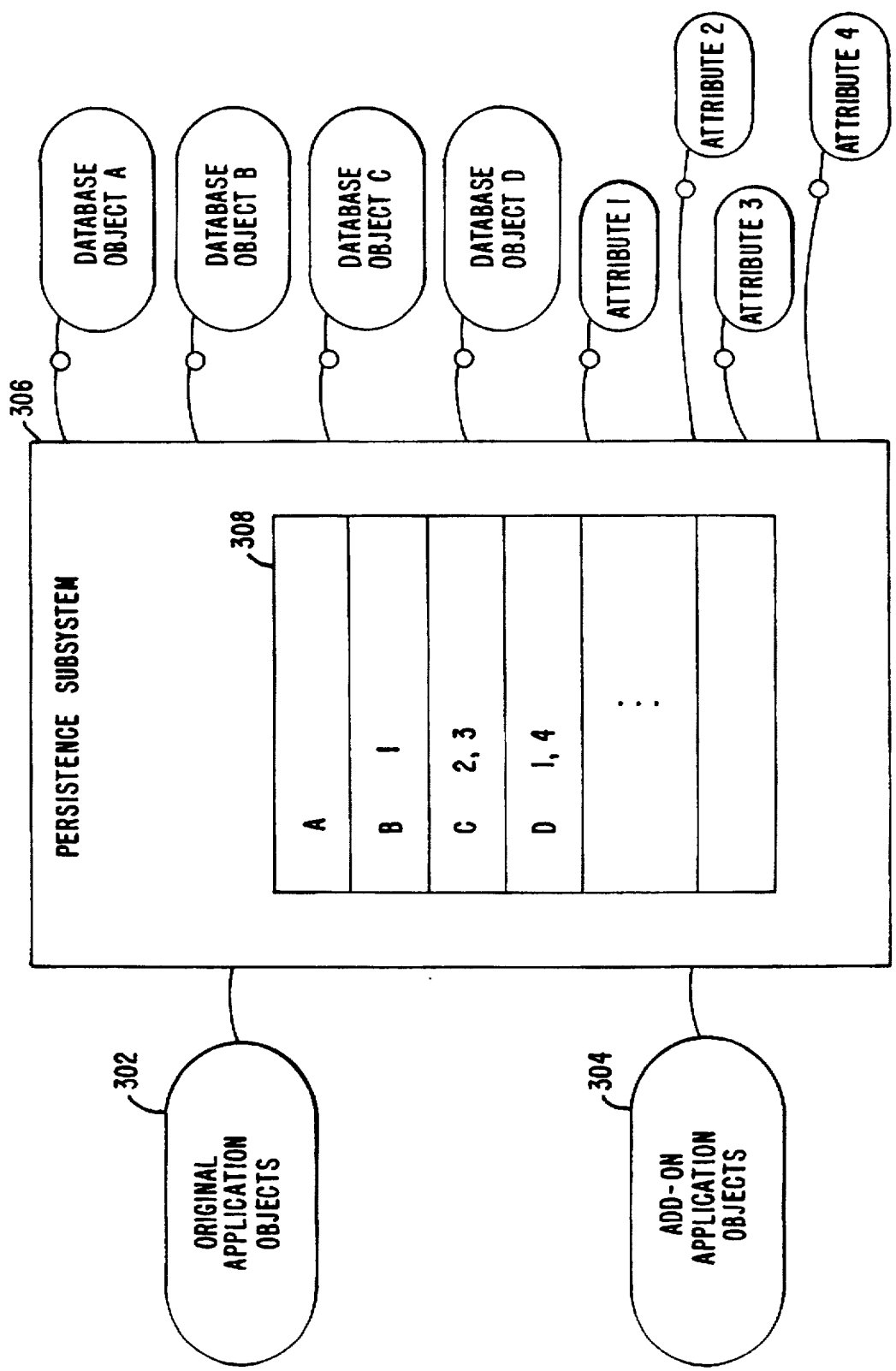
FIG. 5 illustrates the persistence subsystem's role in maintaining associations between original database objects and attribute objects.

FIG. 5 illustrates the persistence subsystem's role in maintaining associations between original database objects and attribute objects. In FIG. 5, original application objects 302 and add-on application objects 304 may access, create and destroy database objects and attributes as before, however, all accesses, creation and destruction operations are through a process referred to in a preferred embodiment as the "persistence subsystem" 306. The persistence subsystem maintains the association between database objects and attributes. The persistence subsystem may be implemented using additional objects, functions, procedures, etc. and may be an application program, part of the operating system or some other form of utility or resource within a computer system implements the present invention. In FIG. 5, persistence subsystem 306 is an object with an interface that is accessed by application objects 302 and 304.

In FIG. 5, persistence subsystem 306 is shown maintaining associations between database objects A–D and attributes 1–4 by means of list 308 that includes object identifiers. In table 308, a primary object is shown for each row in the table as indicated by a letter. Any attributes associated with the primary object are shown in the same row as the primary object and are indicated with a number. To continue with the example above, the primary objects are the original application objects that specify simple geometries for furniture while the attributes are add-on satellite objects which include the surface material definition for their associated object. In the preferred embodiment, a component called the Associativity System is used to maintain associations, or relationships. As will be readily apparent to one of skill in the art, many data structures or alternative ways to maintain associations between database objects and attributes are possible. For example, data structures such as objects, tables of pointers, etc. may be employed.

As shown in FIG. 5, persistence subsystem 306 acts as an intermediary for all operations by application objects 302 and 304 upon the database objects and associated attributes. This allows original application objects 302 to access original database objects A–D normally. This also allows add-on application objects 304 to access attributes 1–4 which are associated with the database objects. For example, original application objects 302 can request that data from database object A be obtained. Persistence subsystem 306 receives the request and accesses database object A for the requested data which is returned to the requesting object. When an add-on application object requests an attribute value associated, e.g., with database object B, persistence subsystem 306 determines that attribute object 1 is associated with database object B and requests the value from attribute object 1. The value is then given to the requesting add-on application object.

Note that the original application objects may still access database object B normally, even though database object B has additional data, in the form of attribute 1, associated with it. Both the original application objects and the add-on application objects are free to access, create and destroy objects. The original application objects can create and destroy database objects while the add-on application objects can create and destroy both database objects and attributes.

In the preferred embodiment, when a database object is destroyed, any attributes that are only associated with the destroyed database object and no other database object are, themselves, destroyed. Another possibility is to keep the "orphaned" attribute objects in existence for later association with different database objects, or even allow accessing of orphaned attributes in the absence of any primary database object associated with the attribute.

As shown in table 308, database objects may have zero, one or more attributes associated with them. Also, attributes may be associated with more than one database object. Many variations on the type of associations that can be made between add-on attributes and primary objects are possible. As discussed above, there may be many layers of associations by having attributes associated with attributes. Also, primary objects can be associated with each other, as desired. The invention allows an intermediary process, such as the persistence subsystem in the preferred embodiment, to create, maintain and destroy any logical associations between any objects in the system. The actions of the intermediary process can be by the request of application, or other, objects, as in the preferred embodiment, or may be by request of a user of the computer system, the operating system, the persistence subsystem, itself, etc.

Figure 6:
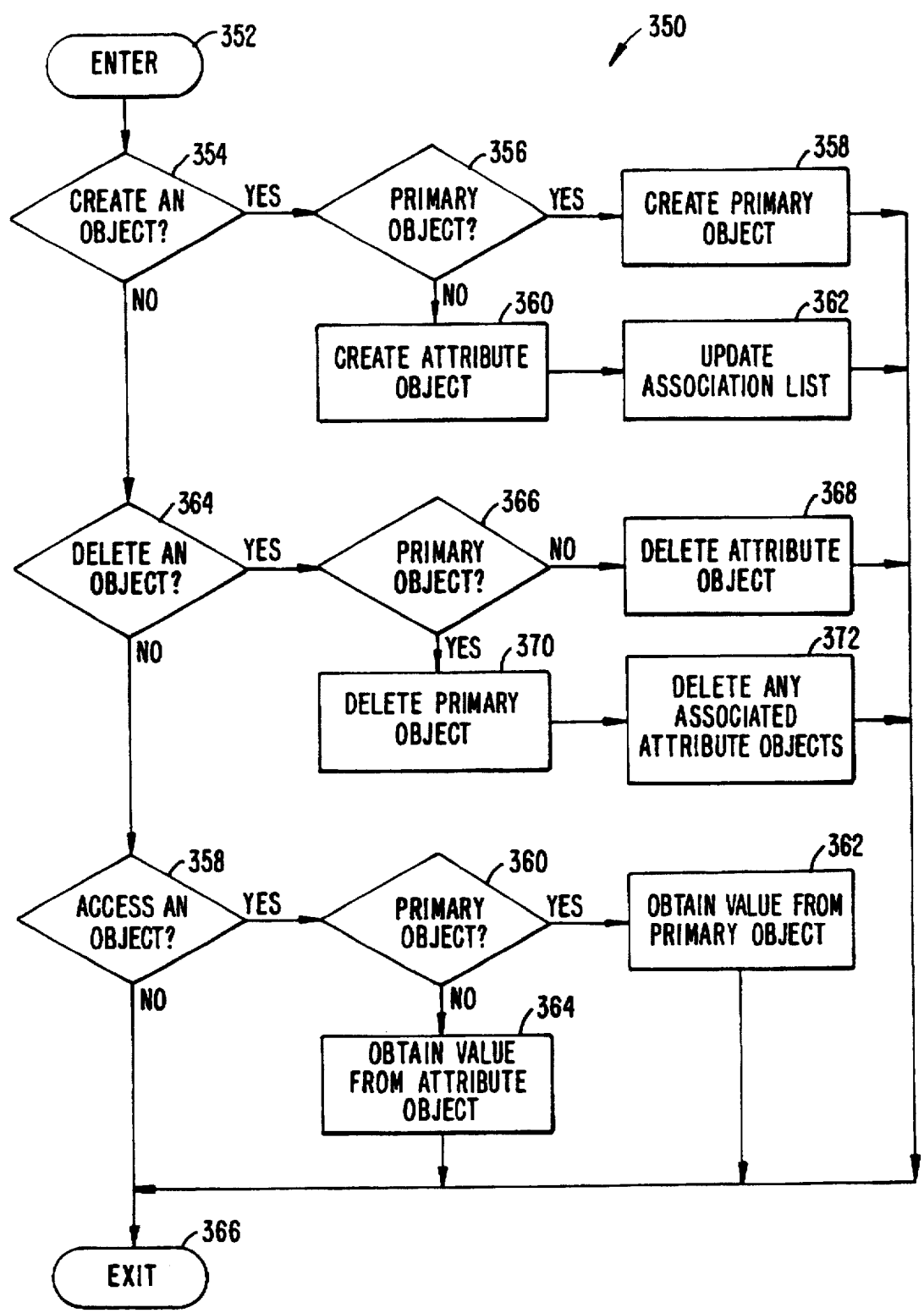
FIG. 6 shows a flowchart of the steps in the operation of the persistence subsystem of FIG. 5.

FIG. 6 shows a flowchart of the steps in the operation of the persistence subsystem of FIG. 5 with respect to creating, deleting and accessing an object. In general, the flowcharts in this specification illustrate one or more software routines executing in a computer system such as computer system 1 of FIG. 2. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention. Additional considerations in implementing the method described by the flowchart in software may dictate changes in the selection and order of steps. Some considerations are event handling by interrupt driven, polled, or other schemes. A multiprocessing or multitasking environment could allow steps to be executed "concurrently." For ease of discussion the implementation of each flowchart is referred to as if it is implemented in a single "routine".

In FIG. 6, flowchart 350 is entered at step 352 where it is assumed that an application object desires to perform a creation, deletion or access operation on a primary object or an add-on attribute of a primary object. At step 354 a check is made as to whether the desired operation is to create an object. If so, step 356 is executed to determine whether the object to create is a primary object or an attribute. If the object to be created is a primary object, step 358 is performed to create the primary object and the routine exits at step 366. In OLE, this is performed in the standard way by using the OLE/COM function "CoCreateInstance."

If, instead, at step 356 the object to be created is an add-on attribute, or satellite object, step 360 is performed to create the attribute. Next, step 362 is executed to update the table of associations to add an entry indicating that the attribute is associated with a specified primary object. The routine exits at step 366. It is assumed that the calling object that wishes to create the attribute object also specifies the primary object that is to be associated with the attribute object.

If, at step 354, the check determines that the operation desired is not to create an object, execution proceeds to step 364 where a check is made as to whether the desired operation is to delete an object. If so, step 366 is performed where a check is made as to whether the object to delete is a primary object. If not, the object is an attribute object and step 368 is performed to delete the attribute object. The routine then exits at step 366. If, at step 366, the object to delete is determined to be a primary object, step 370 is performed to delete the primary object. Next, step 372 is executed to delete any attributes associated with the deleted primary object. This is to prevent orphaned object as discussed above. Also, the primary objects row entry is removed from the table. The routine then terminates at step 366.

If, at step 364, it is determined that deletion of an object is not desired, step 358 is executed to determine whether the requesting object wants to access an object or attribute in the database. If not, execution of the routine of flowchart 350 terminates at step 366. If so, step 360 is performed to determine whether the object to be accessed is a primary object. If the object is a primary object then step 362 is invoked to obtain the desired value from the primary object. Note that accessing the object could be for purposes of invoking a function or method of the object. In this case the persistence subsystem would invoke the corresponding function or method in the desired object. If the object is not a primary object then it is assumed that the object must be an attribute object and step 364 is performed to obtain the desired value from the object. Any data manipulation of the object, invoking of executable code of the object, etc. can be performed at steps 362 and 364, similar to that allowed upon objects in an operating environment such as OLE or C++. After completion of either of steps 362 or 364 the routine exits at step 366.

There are many object oriented environments produced by various developers and defined in many publications. Specific implementations or definitions of object oriented environments may differ, sometimes greatly, in the implementation of standard concepts and principles of object oriented programming. However, it will be readily apparent to one of ordinary skill in the art that, although only two instances of object oriented environments, C++ and OLE are discussed in this specification, the invention may be applicable to any object oriented environment implementation as determined by the appended claims.

What is claimed is:

1. A method for associating a property with an object in a computer system, wherein the computer system includes a processor coupled to a memory and a storage device, wherein the computer system includes objects, wherein an object includes one or more data members, wherein the computer system includes a definition of a class that specifies one or more class properties of an object, the method comprising the steps of:

compiling a definition of a first object as a first instance of the class, wherein the first object has the class properties specified in the class;

compiling a definition of a second object as a second instance of the class, wherein the second object has the class properties specified in the class;

compiling a definition of a third object, wherein the third object includes an added property that is not specified in the class;

performing the following steps subsequent to the compiling steps, above:

using the definition of a first object to create a first object;

using the definition of a second object to create a second object;

using the definition of a third object to create a third object;

associating the third object with the second object;

executing instructions in a first application to access the first object and transfer information about the first object's class properties to the first application;

executing instructions in the first application to access the second object and transfer information about the second object's class properties to the first application; and executing instructions in a second application to access the second object and transfer information about the added property of the third object associated with the second object to the second application.

2. The method of claim 1, further comprising the steps of:

removing the association between the third object and the second object; and in response to the step of executing instructions in a second application, indicating to the second application that the added property is not available in association with the second object.

3. The method of claim 1, further comprising the steps of:

modifying the added property; and subsequent to the step of altering the added property, and in response to the step of executing instructions in a second application, providing information to the second application about the modifications to the added property.

4. The method of claim 1, wherein a plurality of objects is associated with the third object so that any of the plurality of objects, when accessed by the second application, return information about the added property.

5. The method of claim 1, wherein the computer system includes functionality specified in the object linking and embedding (OLE) system of Microsoft, Corp., the method further comprising the steps of:

creating a type library that includes information about the objects and the properties of the objects; and wherein the step of associating the third object with the first object does not cause the type library to be modified.

6. The method of claim 1, wherein the added property is data.

7. The method of claim 1, wherein the added property is a function.

* * * * *